United States Patent [19]
Okamura

[11] Patent Number: 6,105,052
[45] Date of Patent: Aug. 15, 2000

[54] DATA PROCESSING METHOD, RECORDING MEDIUM, AND DATA PROCESSING APPARATUS

[75] Inventor: Hideaki Okamura, Tokyo, Japan

[73] Assignee: Sony Corporation, Tokyo, Japan

[21] Appl. No.: 09/141,123

[22] Filed: Aug. 27, 1998

[30] Foreign Application Priority Data

Aug. 29, 1997 [JP] Japan .................................... 9-234981

[51] Int. Cl.[7] .................................................. G06F 9/00
[52] U.S. Cl. .......................................................... 709/104
[58] Field of Search .................................. 709/100, 101, 709/102, 104, 106; 714/37, 38, 15

[56] References Cited

U.S. PATENT DOCUMENTS

| | | | |
|---|---|---|---|
| 5,666,532 | 9/1997 | Saks et al. | 395/621 |
| 5,752,031 | 5/1998 | Cutler et al. | 709/103 |
| 5,799,188 | 8/1998 | Manikundalam | 709/108 |
| 5,872,909 | 2/1999 | Wilner et al. | 714/38 |

*Primary Examiner*—Majid Banankhah
*Attorney, Agent, or Firm*—Frommer Lawrence & Haug, LLP.; William S. Frommer

[57] ABSTRACT

The present invention realizes a pure object-oriented operating system that allows a flexible system configuration and lowers the number of context-switches. The realization method in the present invention is: when a message sending source object executes a specified method to send a message to a message-destination object, first, execution of the message-sending source object is discontinued and context data corresponding to the message-sending source object is modified to indicate that execution is discontinued. Then, a specified module containing descriptions of message-sending related procedures is invoked and one of said procedures that corresponds to the specified method is executed to retrieve the context data of the message-destination object. Then, the context data found in the above retrieval is modified to indicate that the object corresponding to the context data is under execution, and the message is passed from the message-sending source to the message destination object.

15 Claims, 9 Drawing Sheets

FIG. 2

| TYPE OF METAOPERATION | OBJECT STARTED AS METAOBJECT | INDEX OF METHOD TO BE EXECUTED |
|---|---|---|

FIG. 3

| TYPE OF METAOPERATION | OBJECT STARTED AS METAOBJECT | INDEX OF METHOD TO BE EXECUTED |
|---|---|---|
| SEND MESSAGE | MAILER OBJECT | SEND-METHOD INDEX |
| MEMORY ALLOCATION | MEMORY MANAGER INDEX | NEW-METHOD INDEX |
| ⋮ | ⋮ | ⋮ |

DATA PROCESSING METHOD, RECORDING MEDIUM, AND DATA PROCESSING APPARATUS

BACKGROUND OF THE INVENTION

1. Field of the Invention

The present invention relates to a data processing method that executes data processing on an object basis while storing on an object basis information concerning states of execution of the objects. The invention also relates to a recording medium containing an operating system that implements the processing method and to a data apparatus having the recording medium. Details of certain features of the present invention are described in European Patent Application No. 0,753,811 A1 entitled "Data processing method and device" and filed by the same assignee on Jul. 12, 1996 claiming a Convention Priority on JP 178625/95, filed Jul. 14, 1997, the complete disclosure of which is hereby incorporated herein by reference.

2. Description of the Related Art

Existing architectures apply object orientation to modularize the operating system configuration elements as objects. Such an operating system in which configuration elements are thus modularized as objects is called an object-oriented operating system. An object-oriented operating system allows its system operation to be defined by a series of execution control-switches. This switching is called context-switching.

Execution performance of an operating system heavily relies on the number of context-switches. For example, for implementing the same processing, a program needing a higher number of context-switches requires a longer processing time than a program needing a lower number of context-switches.

Incidentally, either an operating system or application program that runs on the operating system consists of objects. The individual objects have an execution mechanism. The operating system having objects with substantially the same execution mechanism as for the application program objects is called a pure object-oriented operating system. When one object requests a service from another object, the two are respectively called a service requester and a service provider. When a service requester issues a request to the service provider, context-switching is performed from the service requester to the service provider, then the service provider offers a service to the service requester.

In the above processing, if the relationship between the service requester and the service provider is defined for all the objects on the operating system, operation of the pure object-oriented operating system is defined through a series of context-switches between the service requester and the service provider. This allows the central part (i.e. the part that cannot be defined as an object) of the operating system to exclusively perform context-switching. This minimizes the central part of operating system to realize a system configuration that is flexible for the user and the hardware requirements.

However, allowing the central part of operating system to exclusively perform context-switching increases the number of context-switches and thus causes a problem of lowering the performance of the operating system.

SUMMARY OF THE INVENTION

An object of the present invention is to realize a pure object-oriented operating system that allows a flexible system configuration and lowers the number of context-switches. The realization method in the present invention is: when a message sending source object executes a specified method to send a message to a message-destination object, first, execution of the message-sending source object is discontinued and context data corresponding to the message-sending source object is modified to indicate that execution is discontinued. Then, a specified module containing descriptions of message-sending related procedures is invoked and one of said procedures that corresponds to the specified method is executed to retrieve the context data of the message-destination object. Then, the context data found in the above retrieval is modified to indicate that the object corresponding to the context data is under execution, and the message is passed from the message-sending source to the message destination object.

To these ends, according to one aspect of the present invention, there is provided a data processing method in which data processing is executed on an object basis while information on execution states of objects are stored as context data on an object basis. The data processing method executes the following steps on condition that predetermined conditions are satisfied when a message-sending source object sends a message to a message-destination object through execution of a specified method corresponding to a message-sending instruction: discontinuing execution of the message-sending source object and modifying the context data corresponding to the message-sending source object to indicate that the execution is discontinued; invoking a specified module provided with descriptions of message-sending related procedures and executing one of the procedures, described in the module, that corresponds to the specified method thereby performing a retrieval for the context data corresponding to the message-destination object; and modifying the context data found in the retrieval to indicate that the object corresponding to the context data is under execution, and passing the message from the message-sending source object to the message-destination object.

The data processing method in the present invention, when specified conditions are satisfied, execution of a message-sending source object is discontinued and the context data corresponding to the object is modified to indicate that the execution is discontinued. Then, a specified module provided with the description of message-sending related procedure is executed to retrieve the context data corresponding to the message-destination object. The context data found in the above retrieval is modified to indicate that the object corresponding to the context data is under execution, and the message-destination object is shifted to be under execution. As a result, context-switching is caused to shift execution from the message-sending source object to the message-destination object.

According to another aspect of the present invention, there is provided a computer-readable recording medium containing an operating system. This operating system implements a data processing method that executes the following steps on condition that the predetermined conditions are satisfied when a message-sending source object sends a message to a message-destination object through execution of a specified,method corresponding to a message-sending instruction: discontinuing execution of the message-sending source object and modifying the context data corresponding to the message-sending source object to indicate that the execution is discontinued; invoking a specified module provided with descriptions of message-sending related procedures and executing one of the procedures, described in the module, that corresponds to the specified method thereby performing a retrieval for the context data corresponding to the message-destination object; and modifying the context data found in the retrieval to indicate that the object corresponding to the context data is under execution, and passing the message from the message-sending source object to the message-destination object.

Use of the operating system stored in the recording medium in the present invention allows the following: when the predetermined conditions are satisfied, first, execution of message-sending source object is discontinued and context data corresponding to the object is modified to indicate that execution of the object is discontinued. Then, a specified module provided with descriptions of message-sending related procedures is executed to retrieve the context data corresponding to the message-destination object. The context data found in the above retrieval is then modified to indicate that the object corresponding to the context data is under execution, and the message-destination object is shifted to be under execution. As a result, context-switching is caused to shift execution from the message-sending source object to the message-destination context.

According to still another aspect of the present invention, there is provided a data processing apparatus having a computer-readable recording medium containing an operating system. This operating system implements a data processing method that executes the following steps on condition that the predetermined conditions are satisfied when a message-sending source object sends a message to a message-destination object through execution of a specified method corresponding to a message-sending instruction: discontinuing execution of the message-sending source object and modifying the context data corresponding to the message-sending source object to indicate that the execution is discontinued; invoking a specified module provided with descriptions of message-sending related procedures and executing one of the procedures, described in the module, that corresponds to the specified method thereby performing a retrieval for the context data corresponding to the message-destination object; and modifying the context data found in the retrieval to indicate that the object corresponding to the context data is under execution, and passing the message from the message-sending source object to the message-destination object.

Use of the operating system stored in the recording medium in the present invention allows the following: when specified conditions are satisfied, first, execution of message-sending source object is discontinued and concurrently context data corresponding to the object is modified to indicate that execution of the object is discontinued. Then, a specified module provided with descriptions of message-sending related procedures is executed to retrieve the context data corresponding to the message-destination object. The context data found in the above retrieval is then modified to indicate that the object corresponding to the context data is under execution, and the message-destination object is shifted to be under execution. As a result, context-switching is caused to shift execution from the message-sending source object to the message-destination context.

BRIEF DESCRIPTION OF THE DRAWINGS

FIG. 2 shows the definition of a metaDescriptor;

FIG. 3 shows an example of a metaDescriptor;

DESCRIPTION OF THE PREFERRED EMBODIMENTS

Referring to the figures, the following describes the preferred embodiments in detail.

1. Hardware Environment

Figure 1:
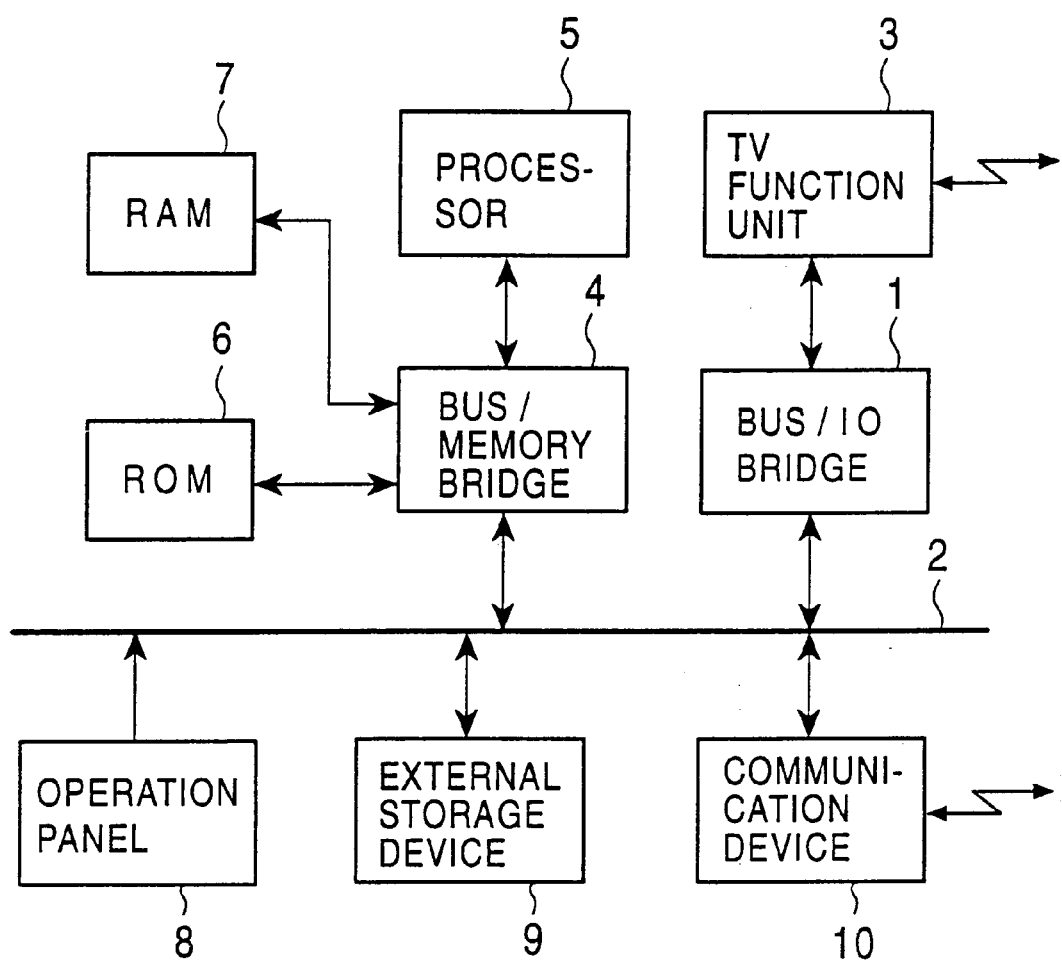
FIG. 1 is a schematic diagram showing an example of a TV system to which the present invention is applied.

Referring to FIG. 1, this section describes an example of a hardware configuration applied to the present invention. The description below uses a configuration in which the present invention is applied to a TV system, as an example of a preferred embodiment. As a matter of course, however, the present invention can be widely applied to other data processors, such as audio and visual (AV) devices other than the TV system, various office machines, and general-purpose computers.

The TV system shown in FIG. 1 which is used with the present invention receives signals via antennae or cables from outside broadcast stations, and based on the signals, it produces images on cathode ray tube (CRT) or liquid crystal display units with sound being played through speakers.

As well as ordinary TV functions, the TV system has other functions that receive programs and data from outside sources, as shown in FIG. 1. The TV system comprises a TV function unit 3 connected to a bus 2 via a bus/IO bridge 1; a processor 5 connected to the bus 2 via a bus/memory bridge 4; a ROM (read only memory) 6 and a RAM (random access memory) 7 connected to the processor 5 via the bus/memory bridge 4; and an operation panel 8, an external storage device 9 and a communication device 10 connected to the bus 2.

The TV function unit 3 provides functions that reproduce the images and the sounds based on signals received via antennae or cables. The TV function unit 3 is connected to the bus 2 via the bus/IO bridge 1, which enables signal exchange with other resources.

The processor 5 controls individual elements of the TV system and is connected to the bus 2 via the bus/memory bridge 4. The processor 5 is also connected with the ROM 6 and the RAM 7. The ROM 6 stores an operating system and the application programs with which the processor 5 performs control. The RAM 7 is used as a work area of the processor 5. In other words, the processor 5 thus uses the RAM 7 as a work area and executes the operating system and the application programs stored in the ROM 6 to control individual elements of the TV system configuration.

The operation panel 8 is an input unit that accepts operation inputs from users. It receives, for example, inputs of instruction signals for switching of TV channels and for adjusting the volume. In particular, the panel 8 consists of an input unit with a plurality of buttons used for inputting various signals and a pointing device such as a mouse, and so on. Signals inputted from the operation panel 8 are then transferred to the processor 5 via the bus 2 and the bus/memory bridge 4. Based on the signals inputted from the operation panel 8, the processor 5 performs the required operations to control the individual elements of the system configuration.

The external storage device 9 consists of devices such as hard disk devices and stores items such as image data, control data, and programs downloaded from external resources via the communication device 10. The communication device 10 is an input-output device for data communication with external resources, and consists of devices such as a modem and terminal adapters.

The TV system provides not only ordinary TV functions but other functions that enable reception of programs and data via the communication device 10. For instance, the TV system receives new software modules from outside networks via the communication device 10 to update the operating system.

The TV system uses the processor 5 to boot the operating system stored in the ROM 6. With the booted operating system, the TV system then executes application programs stored in the ROM 6 and the external storage device 9 to control the individual system configuration elements. The TV system uses the ROM 6 as a computer-readable medium that stores the operating system. The TV system allows the operating system to be stored in the RAM 7 or the external storage device 9. In particular, when the operating system needs be updated, it should be stored in the RAM 7 or the external storage device 9.

In this embodiment, the operating system is a pure object-oriented operating system. This operating system allows the execution of application programs such as those displaying moving images and realizing a graphical-user interface (GUI) controlled by the operation panel 8.

2. Software Environment

This section describes in detail an operating system applied in the present invention and used for the TV system as shown in FIG. 1.

2-1 Operating System Configuration

The operating system consists of a metaCore, the central part of the operating system, and groups of objects. The metaCore is the part that cannot be defined as an object and is rather a processing part that switches execution control between objects, i.e. the part that executes context-switching.

While the metaCore cannot be modified by user programs, the other object groups can easily be modified by user programs. The term modification here means the modification of the operating system that is to be carried out such that all the application programs must be stopped and restarted.

The operating system is a pure object-oriented operating system. The pure object-oriented operating system is referred to as an operating system having objects with substantially the same execution mechanism as objects of the application program that runs on the operating system. From the viewpoint of requesting and providing services, the context-switching between objects is of the following two types:

(1) Control-switching by which execution control shifts from the service requester to the service provider. (2) Control-switching by which execution control returns from the service provider to the service requester.

An object of the requester for services that the operating system provides is called a "base-level object". An object of the provider of services that the operating system provides is called a "metaObject". A service provided by a metaObject is called a "metaOperation". The relationship between the service requester and the service provider is called "base-meta relationship". All the operations within the operating system can be represented using the base-meta relationship.

In the operating system, the part that performs the two types of context-switching as mentioned above is provided in the metaCore. In other words, with this operating system, the necessary minimum mechanisms that configure the operating system are provided by the metaCore.

The operating system has in the metaCore the part of context-switching that involves context data modification. The operating system allows the contents of its configuration objects to be modified without modification of the metaCore contents.

The operating system allows minimization of parts that the user cannot modify and realization of systems that are easily conformable and highly flexible to varying hardware and user requirements. For instance, the operating system need not be rebooted to replace and modify the parts that perform object-to-object message communication. This greatly facilitates debugging of the parts that perform object-to-object communication and the addition of new functions according to the installation of new devices. The foregoing also increases portability of other system configuration elements since the parts relying on the processor architecture are concentrated in the metaCore.

2-2 Interfaces

With the operating system, the metaCore provides two interfaces to realize the above-mentioned two types of context-switching. An interface used when execution control shifts from the service requester to the service provider is called an "M-interface". An interface used when execution control returns from the service provider to the service requester is called an "R-interface". The letter M in "M-interface" denotes "meta call", and the letter R in "R-interface" denotes "reflect".

When context-switching execution from a base-level object to a metaObject is performed, the M-interface provided by the metaCore is used. When context-switching execution from a metaObject to a base-level object is performed, the R-interface provided by the metaCore is used.

To decrease the number of context-switches in order to improve the execution performance, the operating system provides, in addition to the M-interface and the R-interface, another interface that is dedicated for object-to-object message communication. This interface is called an "F-interface", where the letter F denotes "fast send".

2-3 Context Data and metaDescriptor

This section describes context data that is modified at context-switching time. It also describes metaDiscriptors that are part of context data. The descriptions of the individual M-, R-, and F-interface will then follow.

2-3-1 Context Data

Object execution is managed in a data structure called context data. Information on, for example, an execution state is stored in context data on an object basis. Accessing context data therefore presents object states. The context data corresponding to a target object for execution control is modified at context-switching time.

Context data stores object-related information. The information includes the current object state, metaDescriptor, execution mode, interrupt mask, execution stack, immediately-before under-execution object, register save area, and method entry table.

The current object state is the state according to state transition that is linked with a scheduler, i.e. a schedulemanaging object. Example states are "Under-execution", "Message-sent/Waiting-for-a-reply state", and "Interrupted/Busy state".

The metaDescriptor is a data structure that contains information on metaOperation and indicates the relationship between a base-level object and a metaObject. A metaDescriptor contains, for example, the information indicating that an object used in message communication is a "mailer object". The metaDescriptor is described later in detail.

Execution mode is the mode that depends on the processor. The execution mode has, for example, a user mode in which application programs run, and a kernel mode in which the operating system runs. The mode is switched for identification of the type of the processor-defined instructions, which are normally classified into the instructions (privileged instructions) only the operating system is permitted to use, and instructions that application programs are permitted to use. In most cases, the execution mode shifts as follows: when context-switching is generated to shift execution from application program objects to operating system objects, the mode shifts from the user mode to the kernel mode; and when context-switching is generated to shift execution from operating system objects to application program objects, the mode shifts from the kernel mode to the user mode.

The interrupt mask provides predefined interrupts with priority. The interrupt mask contains, for example, information on the interrupt priority, which represents a statement to the effect of: "When an interrupt from an external storage device occurs, an interrupt from a communication device is prohibited."

The execution stack is an area that temporarily stores data. For example, it stores messages exchanged between objects in message communication. As another example, execution stack stores current results of computing operations.

The information regarding the immediately-before under-execution object is actually the information pointing to the context data of the object that was being executed in the very last processing operation. For example, suppose a metaObject executes a metaOperation as requested by a base-level object. In that case, the context data corresponding to the metaObject stores information pointing to the context data of the base-level object that has issued the execution request. The information thus stored in the context data is used to point to the base-level object to which the metaObject returns. This occurs, for example, in the case where, after context-switching by the M-interface from a metaObject to a base-level object, the R-interface performs context-switching execution from the metaObject to the original base-level object. Hereafter, "the information regarding the object that was being executed in the very last processing" is called an "immediately-before under-execution context".

The register save area is an area that temporarily stores data necessary to restart the object, for example, in the case where the object processing is interrupted.

The method entry table stores lists of executable methods. The method is an object-executable function, i.e. a function executable by an object. The method entry table stores indexes and pointers corresponding to the individual methods.

The context data thus stores the information as stated above and it is modified at context-switching time. The information stored in the context data is fed as required to the processor at context-switching time.

2-3-2 metaDescriptors

The metaDescriptor is a data structure that contains metaOperation-related information. In other words, the data structure called a metaDescriptor stores information necessary for realization of base-meta relationships. One metaDescriptor is set for each base-level object and it has pre-described information regarding which method is to be applied from the methods that the metaObject provides.

In particular, each metaDescriptor consists of three array elements: "type of metaOperation", "object started as metaObject", and "index of method to be executed", as shown in FIG. 2. In the "type of metaOperation" field, as information pointing to a metaOperation, a metaOperation index is described. In the "object started as metaObject" field, information pointing to context data of target metaObjects is described. In the "index of method to be executed" field, values corresponding to individual indexes included in the above-mentioned method entry table are described.

In addition, the example in FIG. 3 shows the state of an object referred to as "object A". In this example, object A requires both a send-message metaOperation and a memory allocation-metaOperation; the send-message metaOperation is executed by a mailer-object send method; and the memory-allocation metaOperation is executed by a new method.

In the example in FIG. 3, as the "type of metaOperation", "send message" and "memory allocation" are registered, and as the "object started as metaObject", "mailer object" corresponding to the "send message" is registered; and as the "index of method to be executed", "Send method index" is registered. Further, corresponding to the "memory allocation", as the "object to be started as metaObject", "memory manager object" "is registered and as the "index of method to be executed", "New-method index" is registered.

2-4 M-Interface and R-Interface 2-4-1 Message Send Using M-/R-Interface

Figure 4:
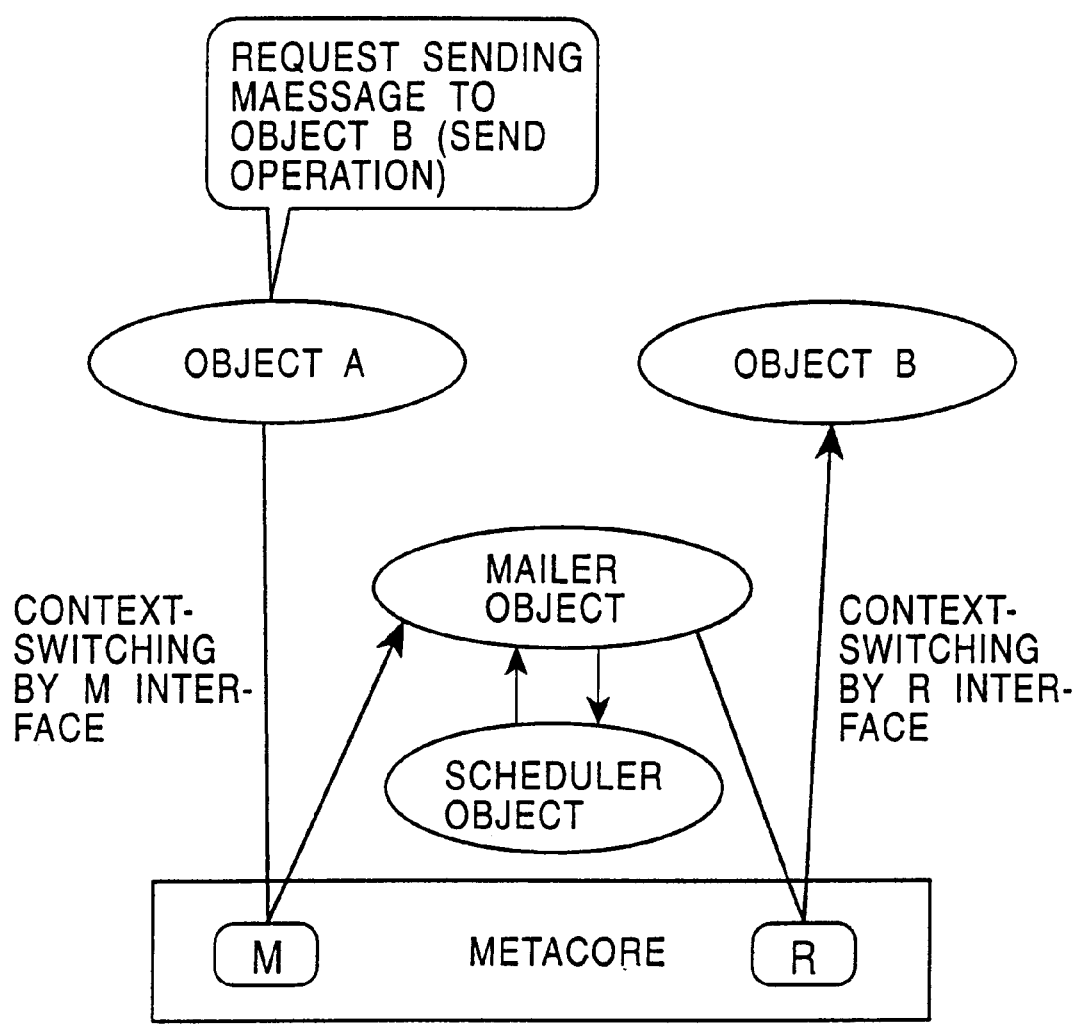
FIG. 4 shows a send-message operation from object A to object B, using an M-/R-interface.

FIG. 4 is an example in which message-sending by the "Send" operation from object A to object B is realized using the M-interface and R-interface.

In the example in FIG. 4, as an object realizing the particular send-message mechanism, a mailer object is assumed to exist. From the point of view of object A and object B, the mailer object is a metaObject. From the point of view of the mailer object, object A and object B are each a base-level object.

The M-interface causes context-switching in response to a send-message request occurring in object A and an invoked Send-operation which is a metaOperation requesting that a message be sent; i.e. context-switching execution from object A to the mailer object is performed. The mailer object thus shifted by context-switching to an under-execution state then generates a scheduling request for a scheduler object, which is assigned for schedule management. During the processing, the mailer object is instructed to recognize a context-switching request to object B. As a result, the mailer object generates context-switching by the M-interface for object B. In other words, context-switching is performed to shift execution from the mailer object to object B. In this way, the operation of sending a message from object A to object B is realized.

Context-switching is thus caused by the M-/R-interface. The processes involved in the context-switching are executed by the metaCore.

2-4-2 Memory Allocation Using M-/R-Interface

Figure 5:
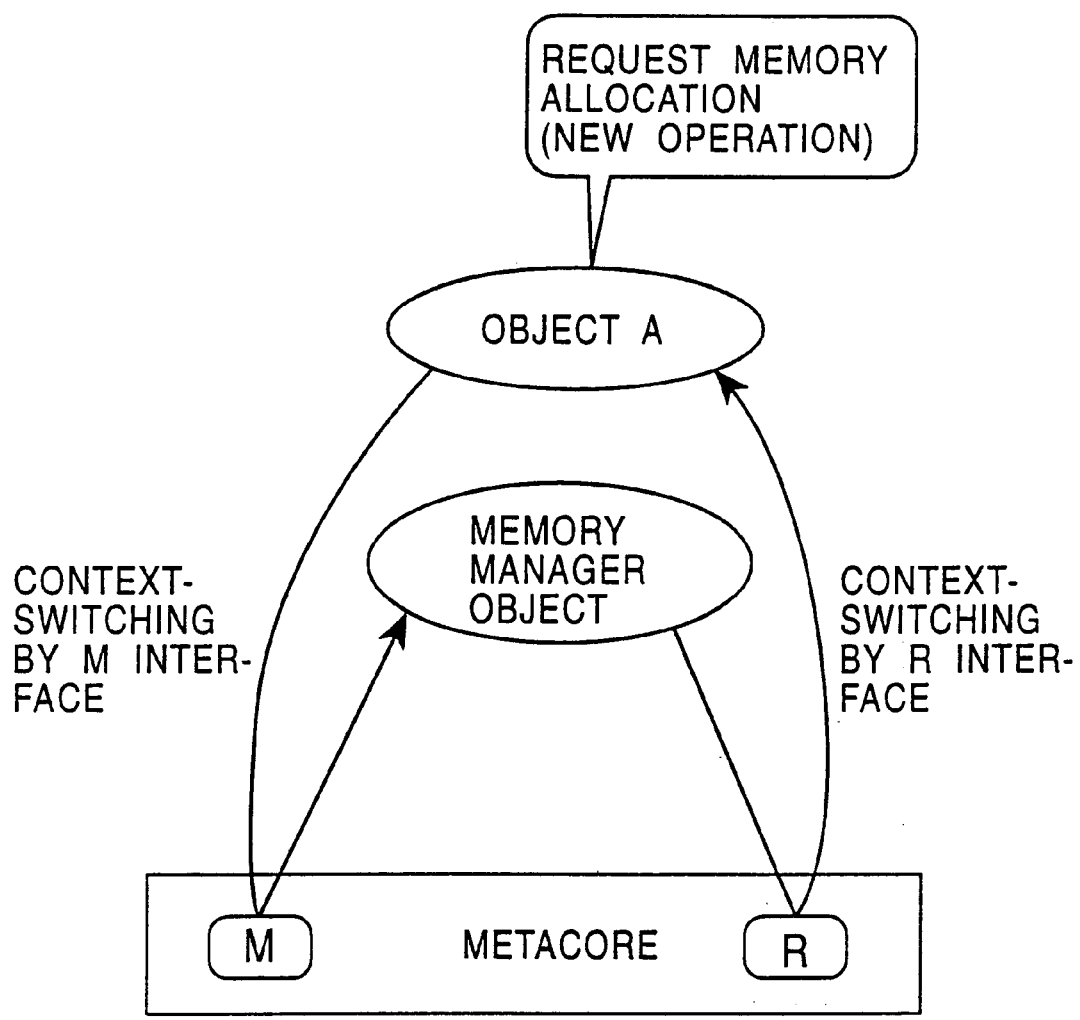
FIG. 5 shows memory allocation in object A, using the M-/R-interface.

FIG. 5 shows an example of a "New" operation. In this example, memory allocation by object A is realized using the M-interface and the R-interface.

In the example in FIG. 5, as an object realizing the particular memory allocation mechanism, a memory manager object is assumed to exist. From the point of view of object A, the memory manager object is a metaObject. From the point of view of the memory manager object, object A is a base-level object.

The M-interface causes context-switching in response to a memory allocation request occurring in object A and an invoked "New" operation which is a metaOperation requesting memory allocation; i.e. context-switching is performed to shift execution from object A to the memory manager object. The memory manager object thus shifted by context-switching to an under-execution state then performs memory allocation for object A. After the memory allocation, context-switching is caused by the R-interface. In other words, context-switching is performed to shift execution from the memory manager object to object A. In this way, the memory allocation for object A is realized.

Context-switching is thus caused by the M-interface and the R-interface. The processes involved in the context-switching are executed by the metaCore.

2-4-3 Defining M-Interface

MetaCore::M(in currentContext,in metaOperation,in parameters)

Where, "currentContext" represents context data of the current under-execution object. In other words, when a request for context-switching by the M-interface occurs at a base-level object, "currentContext" represents the context data of the base-level object that requested the context-switching.

"metaOperation" represents the type of the requested metaOperation. This "metaOperation" is equivalent to the value in the "type of metaOperation" field of the metaDescriptor. In particular, for example, in the send-message case, a metaOperation index pointing to the send message procedure is described.

"parameters" represents parameters passed to a metaOperation. These "parameters" differ depending upon the type of metaOperation. In particular, for example, addresses of storage areas, wherein messages to be sent are stored, are described.

2-4-4 Defining R-Interface

As shown in FIG. 4 and FIG. 5, in the case of context-switching by the M-interface or R-interface, the metaCore references the metaDescriptor to specify the metaOperation. As a result, the R-interface is defined according to the structure of metaDescriptor, as below.

MetaCore::R(in currentContext,in selector,in parameters

Where "currentContext" represents context data of the current under-execution object. In other words, when a request for context-switching by the R-interface occurs at a metaObject, "currentContext" represents the context data of the metaObject that requested the context-switching.

As for "selector", when execution control shifts to a base-level object, it represents the index of the method to be executed by the base-level object. In other words, the information to be described in "selector" is the index that specifies the method to which control returns by the R-interface-caused context-switching. However, when the base-level object is reexecuted immediately before the metaOperation is executed, "selector" is reset to blank and has no description. When the method to which control returns is not specified, nothing is described in "selector".

As for "parameters", when execution control shifts to a base-level object by the R-interface-caused context-switching, it represents parameters passed to the method to be executed by the base-level object. However, when a base-level object is reexecuted immediately before the metaOperation is executed, "parameters" has no description. When the parameters are not passed to the method to which control returns, nothing is described in "parameters".

2-4-5 Context-Switching by M-interface

Figure 6:
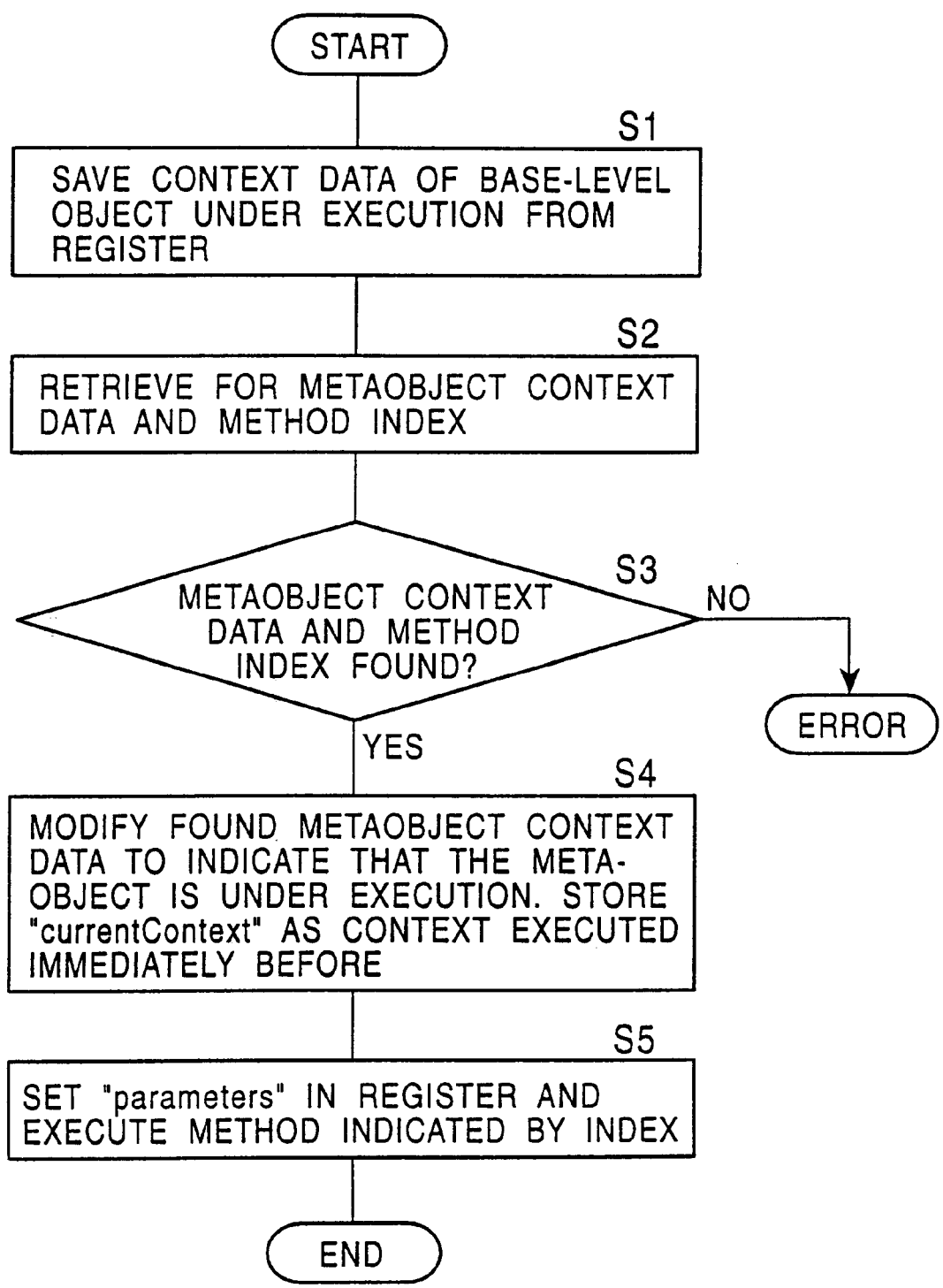
FIG. 6 is a flowchart of a context-switching procedure by the M-interface.

Referring to FIG. 6, this section describes a procedure of context-switching by the M-interface. In the context-switching by the M-interface, the procedure is provided with the descriptions of "currentContext", "metaOperation", and "parameters", as described in the above section, "Defining M-interface."

First, upon a request for context-switching by the M-interface, context data of the current under-execution base-level object is saved from the register in step S1, as shown in FIG. 6.

Next, in step S2, retrieval is performed from the metaDescriptor of the context data indicated in "currentContext". The retrieval items are the context data of the metaOperation specified in "metaOperation" and the method index corresponding to the metaOperation.

Next, in step S3, it is determined from the results of the retrieval in step S2 whether or not the context data of the metaOperation and the method index are found. If they are not found, the processing is discontinued to perform the error processing. If they are found, the processing continues to step S4.

In step S4, the context data of the metaObject is modified to indicate that the metaObject is in an under-execution state. Also, "currentContext" stores the immediately-before-execution context of the context data of the metaObject.

Next, in step S5, "parameters" is set in the register, and the method found in step S2 is executed. The method executed is the method of the metaObject that provides the metaOperation specified in "metaOperation".

The above-mentioned processes complete the context-switching by the M-interface to shift execution from the base-level object to the metaObject.

2-4-6 Context-Switching by R-interface

Figure 7:
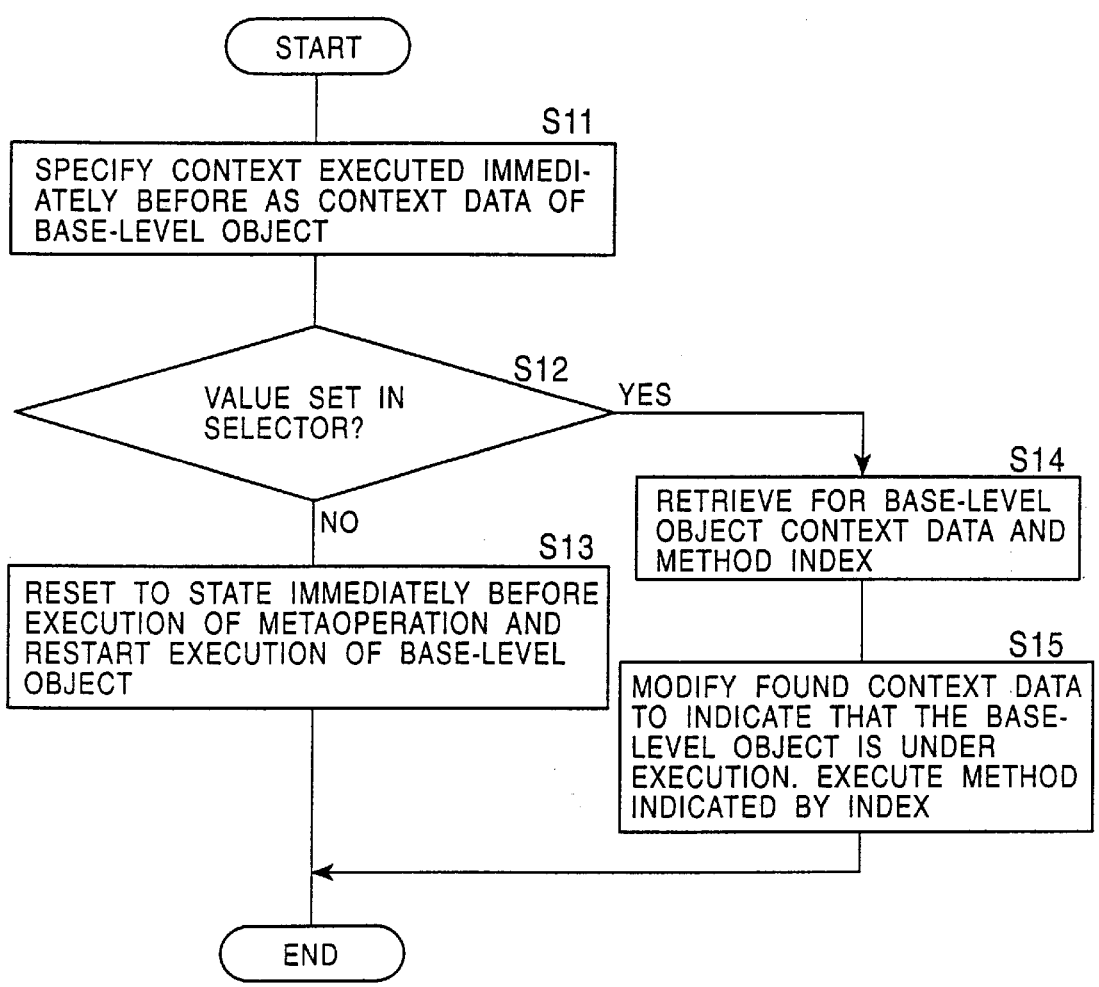
FIG. 7 is a flowchart of a context-switching procedure by the R-interface.

Referring to FIG. 7, this section describes a procedure of context-switching by the R-interface. In the context-switching by the R-interface, the procedure is provided with the descriptions of "currentContext", "selector", and "parameters", as described in the above section, "Defining R-interface".

First, in step S11, upon a request for context-switching by the R-interface, an immediately-before-execution context of the context data represented by "currentContext" is specified as context data of a base-level object to which execution control shifts. The context thus specified is an immediately-before-execution context of the context data of the current under-execution metaObject.

Next, in step S12, it is determined whether or not a value is set in "selector". If a value is set, the processing continues to step S14. If a value is not set, the processing continues to step S13.

In step S13, the procedure returns to the stage where the processing by the base-level object that corresponds to the context data specified in step S11 is discontinued, and the processing by the base-level object is restarted. In other words, the base-level object is reexecuted from the immediately-before-execution state. These processes cause the context-switching by the R-interface to shift execution from the metaObject to the base-level object. The procedure then ends.

In step S14, based on "selector", retrieval is performed for the context data of the base-level object to which execution control is shifted by the context-switching. This step also retrieves the index of the method to be executed when execution control is shifted by the context-switching. In step S15, the context data retrieved in step S14 is then modified to indicate that the base-level object corresponding to the context data is in an under-execution state. These processes cause context-switching by the R-interface to shift execution from the metaObject to the base-level object. The procedure then ends.

2-5 F-Interface

The operating system functions are thus fully implemented using the M-interface or R-interface. However, a problem remains with the execution performance of the operating system. As compared with the operation implemented by operating systems other than object-oriented operating systems, the execution cost for the operating system is higher because of the number of context-switches by the M-interface or R-interface. Especially, the execution of object-oriented programs that involves frequent object-to-object communication greatly increases the execution cost. This is because the object-to-object message communication mechanism of the programs requires context-switching by the M-interface or R-interface.

In the face of the above problem, it is notable that the message communication does not always require execution of metaObjects. Considering this important point, an optimization mechanism for the processing is introduced below. The optimization mechanism is hereafter called a FastSend mechanism. To realize the FastSend mechanism, the F-interface is used.

2-5-1 Application Conditions for FastSend Mechanism

The FastSend mechanism is used to optimize processes in consideration of the fact that the message communication does not always require metaObject execution. For this reason, the FastSend mechanism is used only when the message communication between two objects does not require metaObject execution.

The object-to-object message communication does not require metaObject execution when execution seriality exists between the two objects and the two particular conditions below are satisfied. In the description below, a send-message object is called object A, and a receive-message object is called object B.

The first condition is that, upon completion of sending a message from object A to object B, the two objects do not need to perform concurrent operations. The concurrent operations by object A and object B require processes such as a message queue operation and schedule management that consequently involve execution of metaObjects as the mailer object and the scheduler object. Therefore, when a message is sent from object A to object B, but object A still needs to concurrently operate with object B, the FastSend mechanism cannot be used. An instance meeting the first condition occurs when object A discontinues the processing and awaits a reply from object B after the completion of sending a message from object A to object B.

The second condition is that, upon completion of sending a message from object A to object B, object B is not currently performing processing related to a different message. The situation where object B is currently performing processing related to a different message requires processes such as a message queue operation and schedule management that consequently involve execution of metaObjects such as the mailer object and the scheduler object. Therefore, when object B is currently performing processing related to a message from a different object even after the completion of sending a message from object A to object B, the FastSend mechanism cannot be used.

The FastSend mechanism can thus be used to optimize the processing when both of the two conditions mentioned above are satisfied. The conditions are confirmed to be as follows: upon completion of sending a message from object A to object B, object A and object B do not need to concurrently operate, and object B is not currently performing processing related to a message from a different object.

When the two conditions are satisfied and execution seriality exists between the two objects communicating with each other, the FastSend mechanism allows omission of processes such as the message queue operation and schedule management that were originally required for message communication. With the omission of the processing, the FastSend mechanism eliminates the cost required for invoking metaObjects.

2-5-2 F-Interface and "MessageHandler"

The FastSend mechanism requires particular mechanisms including the following two:

(1) F-interface (2) "MessageHandler"

The F-interface is the third interface following the M-interface and the R-interface. Like the M-interface, the F-interface starts the metaOperation. However, unlike the M-interface, the F-interface processes message communication without starting the metaObject but with procedures in the metaCore.

"MessageHandler" is part of the metaCore and is a mechanism that defines the message communication procedures. "MessageHandler is one of the modules that configure the metaCore. It also contains the description of the message-related procedure. The procedure defined in "MessageHandler" is similar to that defined in the mailer object. Like the mailer object, "MessageHandler" has a mechanism that specifies a message destination. However, unlike the mailer object, "MessageHandler" does not have a mechanism that invokes scheduler objects for message queue operations and scheduling management. This is simply because "MessageHandler" is not designed to include such an invoking mechanism in its task.

Incidentally, "MessageHandler", which is a module having descriptions of message-communication related procedures, can be composed of as either an object or a procedural program module.

2-5-3 Send-Message Operation Using F-interface

Figure 8:
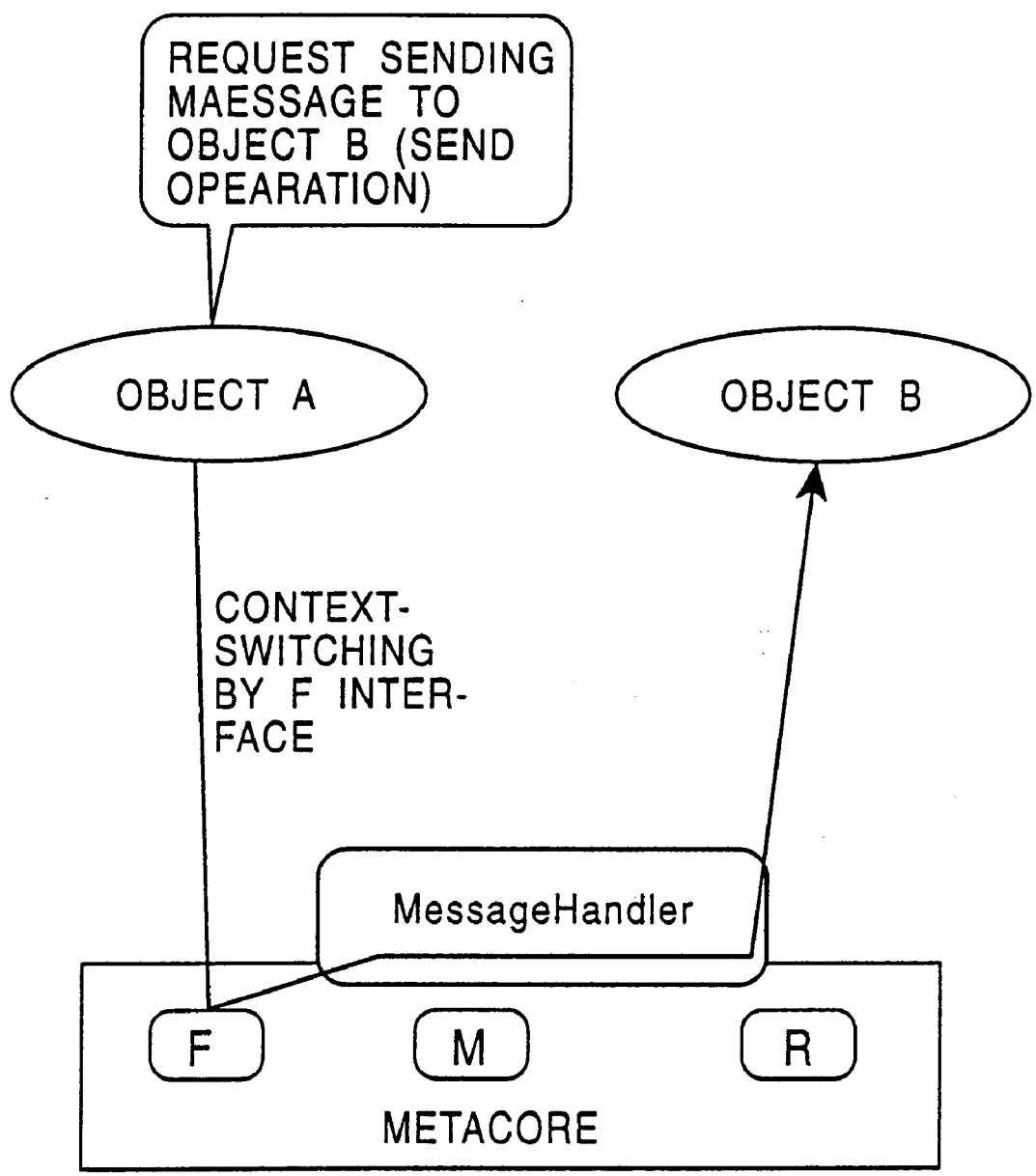
FIG. 8 shows a send-message operation from object A to object B, using an F-interface.

FIG. 8 shows an example of sending a message from object A to object B by means of the "Send" operation, and realizing the operation by means of the FastSend mechanism using the F-interface.

As FIG. 8 shows, the send-message operation with the FastSend mechanism uses "MessageHandler" as a particular mechanism for sending the message.

When a request for send-message by the FastSend mechanism occurs in object A and the "Send" operation which is the metaOperation requesting send-message is invoked as an operation using the F-interface, the F-interface causes context-switching.

In particular, the context-switching is caused to shift execution from object A to object B in the following manner. Without context-switching to such a metaObject as the mailer object, "MessageHandler" which is part of the metaCore is invoked and the procedure described in that "MessageHandler" is executed.

In the above processing, the two conditions described in the earlier part are assumed to be satisfied. In other words, execution seriality exists between object A and object B and these two objects are not concurrently executed, and when object B is invoked, it is not currently performing processing related to a message from a different objects.

In such send-message communication as shown in FIG. 4, at least the following two context-switches are required: context-switching by the M-interface to shift execution from object A to the mailer object; and context-switching by R-interface to shift execution from the mailer object to object B.

However, as shown in FIG. 8, if the send-message operation is performed with the F-interface, only a single context-switching execution from object A to object B is sufficient.

The send-message operation using the F-interface as shown in FIG. 8 thus decreases the number of context-switches to improve the execution performance of the operating system.

2-5-4 Defining F-Interface

As shown in FIG. 8, in the context-switching by the F-interface, the metaCore references the metaDescriptor to specify the metaObject. The F-interface is defined based on the metaDescriptor structure, as shown below.

MetaCore::F(in currentContext,in metaOperation,in parameters)

Where "concurrentContext" represents context data of an under-execution object. It represents context data of the base-level object (message-sending source object) on the occurrence of a request for context-switching by the F-interface.

"metaOperation" corresponds to the index pre-registered and represents the type of the requested metaOperation. "metaOperation" is the information that specifies the meta-Operation to be used. Incidentally, the index used with "metaOperation" corresponds to "MessageHandler" described later.

"parameters" represents the parameters passed to the metaOperation. It differs depending upon the type of the metaOperation. For example, for the send-message operation, "parameters" is provided with the description of a storage address for mail to be sent.

As mentioned above, in invoking "MessageHandler" in order to perform context-switching by the F-interface, the following are passed from the message-sending source object to "MessageHandler": "currentContext" that represents information on context data of the message-sending source object; "metaOperation" that represents the metaOperation to be used; and "parameters" that represents parameters necessary for execution of the metaOperation.

2-5-5 Context-Switching by F-Interface

Figure 9:
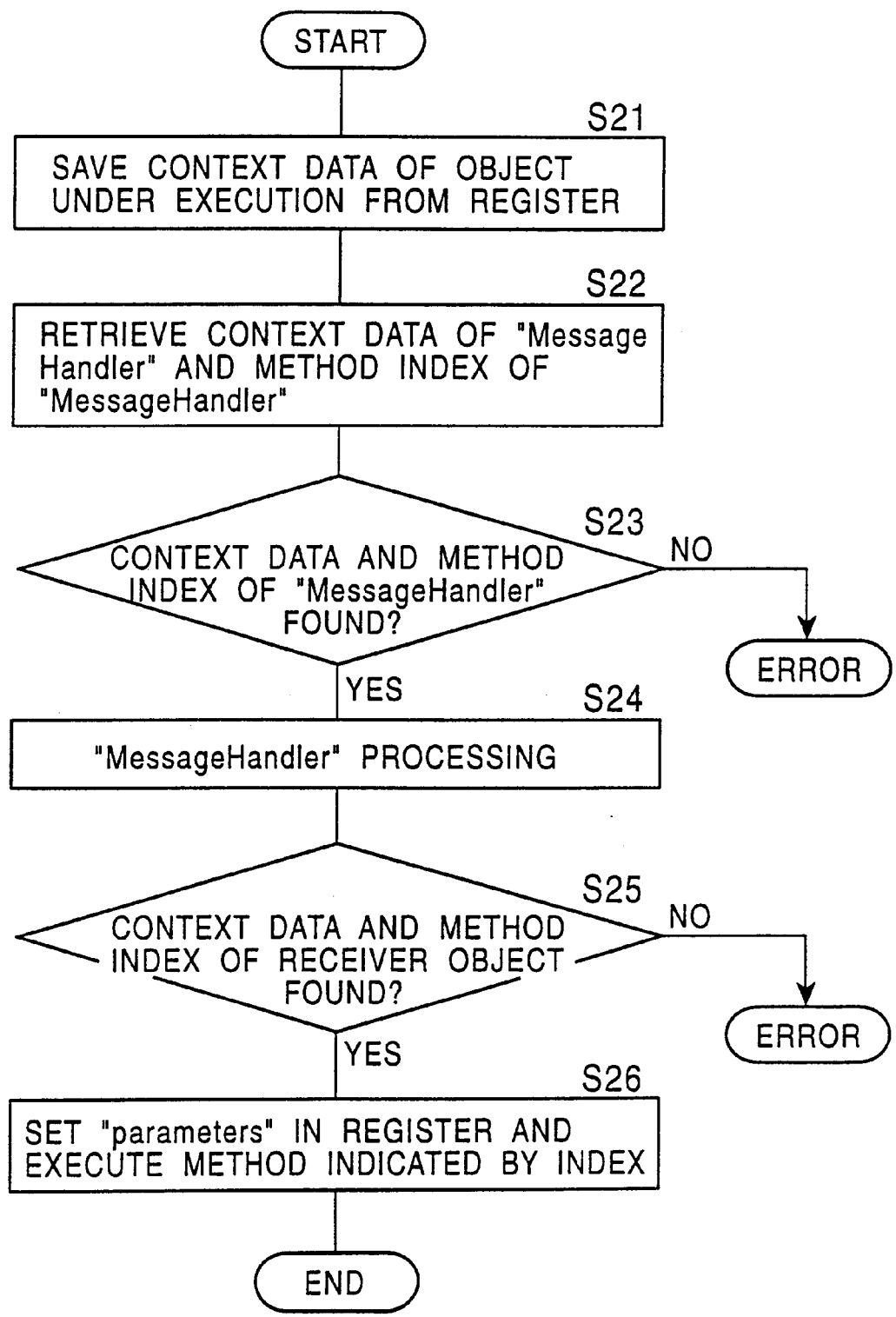
FIG. 9 is a flowchart of a context-switching procedure by the F-interface.

Referring to FIG. 9, this section describes a procedure of the context-switching by the F-interface that is performed in sending a message from one object to another object. In the descriptions below, the message-sending source object is called a sender object, and the message-receiving object is called a receiver object.

In the context-switching by the F-interface, the procedure is provided with the descriptions of "currentContext", "metaOperation", and "parameters", as described in the above section, "Defining F-interface".

Upon a request for context-switching by the F-interface, the following is performed. As shown in FIG. 9, first, in step S21, execution of an under-execution object, i.e. the sender object, is discontinued, the context data is modified to indicate that execution of the sender object is discontinued, then the context data of the sender object is saved from the register.

Next, in step S22, "currentContext" is referenced, and based on "metaOperation", retrieval is performed for the context data containing the "MessageHandler" execution status data. Concurrently, from the indexes of the methods described in "MessageHandler", retrieval is performed for the index of the method that corresponds to "metaOperation".

Next, in step S23, it is determined, based on the results of the retrieval in step S22, whether or not the context data of "MessageHandler" and method index are found. If they are not found, the processing is discontinued to perform error processing. If they are found, the processing continues to step S24.

In step S24, based on the retrieval results from step 23, "MessageHandler" is invoked, and the processing corresponding to "metaOperation" is executed. In other words, "MessageHandler", which is the module containing the descriptions of the send-message related procedure, is invoked from the methods described in this "MessageHandler", and the method corresponding to "meta-Operation" is invoked and then executed. By these processes, retrieval is performed for the index of the method that is executed at the time of context-switching performed for a receiver object.

Next, in step S25, it is determined, based on the retrieval results from step 24, whether or not the context data of the receiver object and the method index are found. If they are not found, the processing is discontinued to perform error the processing. If they are found, the processing continues to step S26.

In step S26, "parameters" is set to the register, and the method found in the step-S24 retrieval, i.e. the method of the receiver object, is executed. In particular, the receiver-object's context data is modified to indicate that the context data of a receiver object is under execution by the receiver object; and concurrently, a message from the sender object is passed to the receiver object, then the method specified by the message is executed.

These processes complete the context-switching by the F-interface to shift execution from the sender object to the receiver object.

Incidentally, the example in FIG. 9 assumes that execution seriality is guaranteed to exist between the sender and the receiver objects. Practically, however, when the seriality does not exist, the "MessageHandler" object may be invoked. Therefore, an exceptional process is necessary to handle the case when the seriality does not exist and "MessageHandler" is invoked in step 24.

Figure 10:
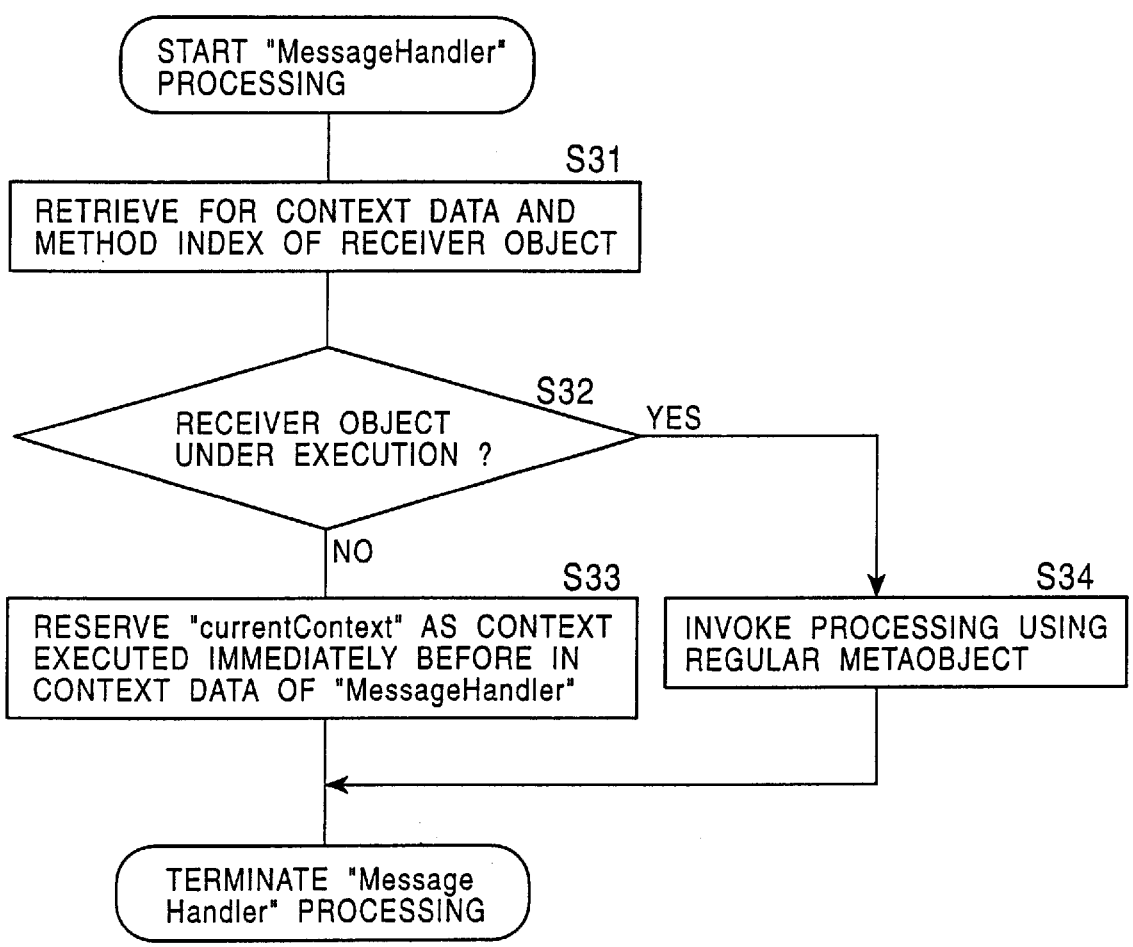
FIG. 10 shows "Message Handler" processing in a "Send" operation.

FIG. 10 shows a processing example for "MessageHandler", including an exceptional process as mentioned above. As an example of the exceptional process, FIG. 10 includes the method that, when the receiver object is under execution, the processing by the FastSend mechanism is discontinued, and the regular procedure (i.e. the procedure that uses the M-interface or the R-interface for send-message operation, as mentioned before) is performed. Incidentally, assuming such invoking of a regular metaObject, the "MessageHandler" interface needs to pass arguments to be used in the invoking process. The type of these arguments should be set as required by the metaObject.

Referring to FIG. 10, the following describes the processing of "MessageHandler" that corresponds to step S24 of FIG. 9.

First, as shown in FIG. 10, in step S31, retrieval is performed for the context data of the receiver object and the index of the method that is to be executed in context-switching to the receiver object.

Next, in step S32, it is determined whether or not the receiver object is in an under-execution state. If it is in an under-execution state, the processing continues to step S34 and invokes the processing using the regular metaObject. In other words, if the receiver object is under execution, the FastSend application conditions are not satisfied and the send-message procedure is therefore implemented using the M-/R-interface.

If the receiver object is not under execution, the processing continues to step S33. Step S33 stores "currentContext"

in the "MessageHandler" context data as an immediately-before-execution context. In other words, this step changes the context data pointed to by an immediately-before-execution context of the "MessageHandler" context data to the receiver-object's context data. Incidentally, the immediately-before-execution context is, for instance, referenced for specification of the sender object in the case, for example, where a reply is sent from the sender object to the receiver object after message-sending by means of the "Send" operation.

Upon completion of the above processes, the processing of the "MessageHandler" object ends, then the processing continues to step S25 shown in FIG. 9.

2-5-6 Defining "MessageHandler" Object interface

Finally, this section describes the interface of "MessageHandler" that the FastSend mechanism uses as described above. When context-switching by the F-interface is performed using the FastSend mechanism, one of "Send", "Call", "Reply", and "WaitFor" invokes a method related to the send-message operation, then executes it. A Send interface is defined as follows:

MessageHandler::Send(in metaContext,in receiverObject,in receiverSelector,out receiverFuture,in baseContext)

Wherein "metaContext" represents the context data of "MessageHandler", "receiverObject" represents a receiver object identifier, "receiverSelector" represents an index of the method that the receiver object executes, "receiverFuture" represents a synchronous identifier, and "baseContext" represents context data of the sender object.

"Call" invokes a procedure that synchronously sends a message to the receiver object. In particular, "Call" invokes a procedure that sends messages to the receiver object while it is waiting for a reply to the sent message. At this time, the send-object execution is discontinued until a reply is received from the receiver object. The interface of "Call" is defined as follows:

MessageHandler::Call(in metaContext,in receiverObject,in receiverSelector,in receiverMessage,in baseContext)

Wherein "metaContext" represents the context data of "MessageHandler", receiverObject" represents the receiver object identifier, "receiverSelector" represents the index of the method that the receiver object executes, "receiverMessage" represents the parameter passed to the receiver object, and "baseContext" represents the context data of the sender object.

"Reply" invokes a procedure that sends a reply to a sender object. The interface of "Reply" is defined as follows:

MessageHandler::Reply(in metaContext,in replyMessage,in baseContext)

Wherein "metaContext" represents the context data of "MessageHandler", "replyMessage" represents the parameter passed to the sender object, and "baseContext" represents the context data of the sender object.

"WaitFor" invokes a procedure that allows the sender object to wait for a reply from the receiver object. The interface of "WaitFor" is defined as follows:

MessageHandler::WaitFor(in metaContext,in receiverFuture,in baseContext)

Wherein "metaContext" represents the context data of "MessageHandler", and "receiverFuture" represents the context data of the receiver object.

Although the invention has been described through its preferred forms, it is to be understood that these embodiments are only illustrative and various changes and modifications may be imparted thereby without departing from the scope of the invention which is limited solely by the appended claims.

What is claimed is:

1. A data processing method in which data processing is executed on an object basis while information on execution states of objects are stored as context data on an object basis, comprising executing the following steps on condition that predetermined conditions are satisfied when a message-sending source object sends a message to a message-destination object through execution of a specified corresponding to a message-sending instruction:

discontinuing execution of the message-sending source object and modifying the context data corresponding to said message-sending source object to indicate that the execution is discontinued;

invoking a specified module provided with descriptions of message-sending related procedures and executing one of said procedures, described in said module, that corresponds to said specified method thereby performing a retrieval for the context data corresponding to the message-destination object; and modifying the context data found in the retrieval to indicate that the object corresponding to said context data is under execution, and passing the message from the message-sending source object to the message-destination object.

2. A data processing method according to claim 1, further comprising the step of:

pre-registering on an object basis the relationships between the method corresponding to message-sending described in the objects and the procedures described in said module;

wherein, from among the procedures described in said module, the procedure corresponding to said specified method is selected by making reference to the contents registered in the pre-registration step, and the selected procedure is executed.

3. A data processing method according to claim 1, wherein said predetermined conditions are satisfied when, upon completion of sending the message from said message-sending source object to the message-destination object, the two objects need not concurrently operate nor said message-destination object is executing processing based on a message from an object other than said two objects.

4. A data processing method according to claim 1, wherein said module is an operating-system-configuring object that provides an environment in which said message-sending source object and said message-destination object are executed, and said procedure described in said module is a method of said operating-system-configuring object.

5. A data processing method according to claim 4, wherein said operating system has a context-switching part that performs context-switching involving context-data modification, and is capable of modifying the contents of said operating-system-configuring without modifying the contents of said context-switching part.

6. A computer-readable recording medium containing an operating system that implements a data processing method that comprises executing the following steps on condition that predetermined conditions are satisfied when a message-sending source object sends a message to a message-destination object through execution of a specified method corresponding to a message-sending instruction:

discontinuing execution of the message-sending source object and modifying the context data corresponding to said message-sending source object to indicate that the execution is discontinued;

invoking a specified module provided with descriptions of message-sending related procedures and executing one of said procedures, described in said module, that corresponds to said method thereby performing a retrieval for the context data corresponding to the message-destination object; and modifying the context data found in the retrieval to indicate that the object corresponding to said context data is under execution, and passing the message from the message-sending source object to the message-destination object.

7. A computer-readable recording medium according to claim 6, wherein said data processing method further comprises the step of:

pre-registering on an object basis the relationships between the method corresponding to message-sending described in the objects and the procedures described in said module;

wherein, from among the procedures described in said module, the procedure corresponding to said specified method is selected by making reference to the contents of the pre-registration, and the selected procedure is executed.

8. A computer-readable recording medium according to claim 6, wherein said predetermined conditions are satisfied when, upon completion of sending the message from said message-sending source object to the message-destination object, the two objects need not concurrently operate nor said message-destination object is executing processing based on a message from an object other than said two objects.

9. A computer-readable recording medium according to claim 6, wherein said module is an operating-system-configuring object, and said procedure described in said module is a method of said operating-system-configuring-object.

10. A computer-readable recording medium according to claim 6, wherein said operating system has a context-switching part that performs context-switching involving context-data modification, and is capable of modifying the contents of said operating-system-configuring without modifying the contents of said context-switching part.

11. A data processing apparatus having a computer-readable recording medium containing an operating system that implements a data processing method that comprises executing the following steps on condition that predetermined conditions are satisfied when a message-sending source object sends a message to a message-destination object through execution of a specified method corresponding to a message-sending instruction:

discontinuing execution of the message-sending source object and modifying the context data corresponding to said message-sending source object to indicate that the execution is discontinued;

invoking a specified module provided with descriptions of message-sending related procedures and executing one of said procedures, described in said module, that corresponds to said method thereby performing a retrieval for the context data corresponding to the message-destination object; and modifying the context data found in the retrieval to indicate that the object corresponding to said context data is under execution, and passing the message from the message-sending source object to the message-destination object.

12. A data processing apparatus according to claim 11, wherein said data processing method further comprise the step of:

pre-registering on an object basis the relationships between the method corresponding to message-sending described in the objects and the procedures described in said module;

wherein, from among the procedures described in said module, the procedure corresponding to said specified method is selected by making reference to the contents registered in the pre-registration step, and the selected procedure is executed.

13. A data processing apparatus according to claim 11, wherein said predetermined conditions are satisfied when, upon completion of sending the message from said message-sending source object to the message-destination object, the two objects need not concurrently operate nor said message-destination object is executing processing based on a message from an object other than said two objects.

14. A data processing apparatus according to claim 11, wherein said module is an operating-system-configuring object, and said procedure described in said module is a method of said operating-system-configuring object.

15. A data processing apparatus according to claim 11, wherein said operating system has a context-switching part that performs context-switching involving context-data modification, and is capable of modifying the contents of said operating-system-configuring without modifying the contents of said context-switching part.

* * * * *